US008819594B2

(12) United States Patent
Gutz et al.

(10) Patent No.: US 8,819,594 B2
(45) Date of Patent: Aug. 26, 2014

(54) HANDLING USER-INTERFACE GESTURES IN NON-RECTANGULAR REGIONS

(75) Inventors: Steven John Earl Gutz, Gloucester (CA); Graham Andrew Watts, W. Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 12/725,313

(22) Filed: Mar. 16, 2010

(65) Prior Publication Data

US 2011/0138355 A1 Jun. 9, 2011

(30) Foreign Application Priority Data

Dec. 3, 2009 (CA) ...................................... 2686995

(51) Int. Cl.
*G06F 3/048* (2013.01)
*G06F 3/0481* (2013.01)
*G06F 3/0482* (2013.01)

(52) U.S. Cl.
CPC .......... *G06F 3/04812* (2013.01); *G06F 3/0482* (2013.01)
USPC ............................ 715/856; 715/804; 717/115

(58) Field of Classification Search
CPC .............. G06F 3/04812; G06F 3/0482; G06F 3/04892; G06F 3/011; G09G 5/08
USPC ................... 715/804, 856–862; 717/114–116
See application file for complete search history.

(56) References Cited

U.S. PATENT DOCUMENTS

| | | | |
|---|---|---|---|
| 5,790,857 A | | 8/1998 | Clifford et al. |
| 5,821,931 A | * | 10/1998 | Berquist et al. ............... 715/784 |
| 5,969,708 A | * | 10/1999 | Walls ............................. 715/857 |
| 6,031,530 A | * | 2/2000 | Trueblood ..................... 715/791 |
| 6,088,708 A | * | 7/2000 | Burch et al. ................... 715/229 |
| 6,121,981 A | | 9/2000 | Trower, II et al. |
| 6,288,705 B1 | | 9/2001 | Rosenberg et al. |
| 6,295,049 B1 | | 9/2001 | Minner |

(Continued)

OTHER PUBLICATIONS

Bederson, B.B., J. Meyer, and L. Good, "Jazz: An Extensible Zoomable User Interface Graphics Toolkit in Java", Symposium on User Interface Software and Technology Archive, Proceedings of the 13th annual ACM Symposium on User interface Software and Technology, 2000, pp. 171-180, ISBN: 1-58113-212-3, San Diego, California, USA, Total 10 pp.

(Continued)

*Primary Examiner* — Tadeese Hailu
*Assistant Examiner* — James T Durkin
(74) *Attorney, Agent, or Firm* — Janaki K. Davda; Konrad, Raynes, Davda & Victor LLP (57) ABSTRACT

A technique for handling user-interface gestures in non-rectangular regions of a graphical user interface includes creating a class comprising an event handler for an onmouseover event and an event handler for an onmouseout event. The technique further includes adding each of a group of graphical elements to the class. Adding a graphical element to the class includes adding a reference to the graphical element to the class and attaching the event handlers to the graphical element. The technique then identifies a specific graphical element in the group that triggered an invocation of one of the event handlers. The technique then determines the closest border of the specific graphical element to the mouse pointer. In the event another graphical element in the group shares the closest border, the technique stops either the onmouseover or onmouseout event from propagating.

18 Claims, 7 Drawing Sheets

(56) References Cited

U.S. PATENT DOCUMENTS

| | | | |
|---|---|---|---|
| 6,369,821 B2* | 4/2002 | Merrill et al. | 345/473 |
| 6,523,048 B2* | 2/2003 | DeStefano | 715/234 |
| 6,628,315 B1* | 9/2003 | Smith Dawkins et al. | 715/856 |
| 6,885,363 B2* | 4/2005 | Smith | 345/157 |
| 7,290,217 B2 | 10/2007 | Jones et al. | |
| 7,523,418 B2* | 4/2009 | Trewin | 715/858 |
| 8,091,030 B1* | 1/2012 | Ballagh et al. | 715/738 |
| 8,122,354 B1* | 2/2012 | Torgerson | 715/710 |
| 2002/0050978 A1* | 5/2002 | Rosenberg et al. | 345/156 |
| 2004/0135824 A1* | 7/2004 | Fitzmaurice | 345/856 |
| 2004/0189714 A1* | 9/2004 | Fox et al. | 345/810 |
| 2004/0261037 A1* | 12/2004 | Ording et al. | 715/788 |
| 2005/0086610 A1* | 4/2005 | Mackinlay et al. | 715/817 |
| 2005/0195221 A1* | 9/2005 | Berger et al. | 345/660 |
| 2006/0041892 A1* | 2/2006 | Need | 719/318 |
| 2007/0204047 A1* | 8/2007 | Parker et al. | 709/227 |
| 2007/0220448 A1* | 9/2007 | Trewin | 715/856 |
| 2008/0307308 A1 | 12/2008 | Sullivan et al. | |
| 2009/0094554 A1 | 4/2009 | Karstens | |
| 2011/0029393 A1* | 2/2011 | Apprendi et al. | 705/14.73 |

OTHER PUBLICATIONS

Microsoft Corp., "Creating Nonrectangular Windows Forms", [online], 2009, [Retrieved on Jun. 15, 2009]. Retrieved from the Internet at <URL: http://msdn.microsoft.com/en-us/library/aa984331(VS.71,printer).aspx>, Total 4 pp.

Microsoft, "How to Move a Form by Dragging the Client Area of the Form", [online], 2009, [Retrieved on Jun. 15, 2009]. Retrieved from the Internet at <URL: http://support.microsoft.com/kb/320687>, Total 2 pp.

"More Javascript", [online], [Retrieved on Jun. 15, 2009]. Retrieved from the Internet at <URL: http://www.cs.iastate.edu/~cs104/notes/js2.html>, Total 9 pp.

* cited by examiner

HANDLING USER-INTERFACE GESTURES IN NON-RECTANGULAR REGIONS

CROSS-REFERENCE TO RELATED FOREIGN APPLICATION

This application is a non-provisional application that claims priority benefits under Title 35, Unites States Code, Section 119(a)-(d) or Section 365(b) of Canadian Patent Application Serial No. 2686995, entitled "HANDLING USER-INTERFACE GESTURES IN NON-RECTANGULAR REGIONS", filed on Dec. 3, 2009, by Graham A. Watts and Steven J. E. Gutz, which application is incorporated herein by reference in its entirety.

BACKGROUND

1. Field of the Invention

This invention relates to graphical user interfaces, and more particularly to apparatus and methods for handling user-interface gestures in non-rectangular regions.

2. Background of the Invention

In software products in which a user interface (UI) is created using a scripting language, such as JAVASCRIPT™ it is very common to have script executed when a mouse pointer enters or exits a section of the UI. (JAVASCRIPT is a registered trademark or common law mark of Sun Microsystems in the United States and/or other countries.) This allows for advanced behaviors such as visual feedback to the user, or dynamic fetching of content when the user interacts with portions of the UI. The scripting language typically makes this simple for single rectangular elements of the UI by allowing a programmer to attach an event handler to the onmouseover and onmouseout events of DOM nodes in the HTML markup. Areas of interest in an HTML page, however, can often be made up of many DOM nodes which together do not necessarily form a rectangular region. Since the DOM events in the browser are generated from single DOM nodes, it can be difficult to determine if a mouse pointer entered or exited a region (i.e., a group of DOM nodes as a whole), or just a DOM node within the group of DOM nodes making up the region.

There are a number of techniques that may be used to circumvent the above-described limitation, each with its own pitfalls. For example, a single rectangular parent DOM node may be used to detect the events for all of its children DOM nodes. This solution is simple but is limited to rectangular regions and requires that all DOM nodes in the group be descendents of the parent node generating the events. Alternatively, the position of a mouse pointer may be tracked as the mouse pointer moves over an ancestor DOM node of a DOM node of interest. The coordinates of the mouse pointer may be checked to see if it is over the DOM node of interest. This solution can be expensive and may decrease performance within the browser as it may cause many mouse move events to be generated. Alternatively, image maps may be used on images to detect polygonal regions. This solution, however, is limited to images.

In view of the foregoing, what are needed are apparatus and methods to handle user-interface gestures in non-rectangular regions of a user interface. More specifically, apparatus and methods are needed to efficiently control the behavior of groups of graphical elements, such as groups of DOM nodes. Ideally, such an apparatus and method would provide excellent performance within a browser.

SUMMARY

The invention has been developed in response to the present state of the art and, in particular, in response to the problems and needs in the art that have not yet been fully solved by currently available apparatus and methods. Accordingly, the invention has been developed to provide apparatus and methods to handle user-interface gestures in non-rectangular regions of a graphical user interface. The features and advantages of the invention will become more fully apparent from the following description and appended claims, or may be learned by practice of the invention as set forth hereinafter.

Consistent with the foregoing, a method for handling user-interface gestures in non-rectangular regions of a graphical user interface is disclosed herein. In one embodiment, such a method includes creating a class comprising an event handler for an onmouseover event and an event handler for an onmouseout event. The method further includes adding each of a group of graphical elements to the class. Adding a graphical element to the class may include adding a reference to the graphical element to the class and attaching the event handlers to the graphical element. The method may then identify a specific graphical element in the group that triggered an invocation of one of the event handlers. The method then determines the closest border of the specific graphical element to the mouse pointer. In the event another graphical element in the group shares the closest border, the method stops either the onmouseover or onmouseout event (depending on which event handler was called) from propagating. In the event another graphical element in the group does not share the closest border, the method allows either the onmouseover or onmouseout event (depending on which event handler was called) to propagate.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, certain aspects of the invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, certain aspects of the invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as JAVA™, Smalltalk, C++, or the like, conventional procedural programming languages such as the "C" programming language or similar programming languages, or scripting languages such as JAVASCRIPT™ or Adobe Flex. (JAVA is a registered trademark or common law mark of Sun Microsystems in the United States and/or other countries.) Computer program code for implementing the invention may also be written in a low-level programming language such as assembly language.

The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of processes, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
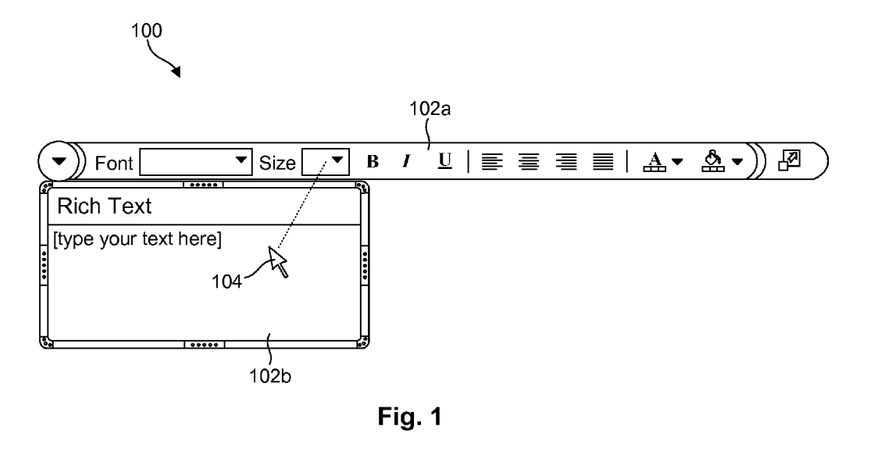
FIG. 1 is a diagram of one example of a user interface showing two graphical elements, in this example a toolbar and a text box widget, the combination of which form a non-rectangular region.

Referring to FIG. 1, one embodiment of a user interface showing two graphical elements 102, in this example a toolbar 102a and a text box widget 102b, is illustrated. In this example, the graphical elements 102 are substantially rectangular, although the graphical elements 102 together form a non-rectangular region 100. In certain embodiments, the graphical elements 102 are DOM nodes within HTML markup although the apparatus and methods disclosed herein are not necessarily limited to DOM nodes, but may apply generally to other types of graphical elements 102.

In certain embodiments, each graphical element 102 may generate certain events when a mouse pointer 104 passes into or out of the graphical element 102. For example, moving the mouse pointer 104 into a graphical element 102 may generate an "onmouseover" event and moving the mouse pointer 104 out of a graphical element 102 may generate an "onmouseout" event. These events may be used to cause certain types of behavior to occur for the graphical elements 102, such as visual feedback to the user or dynamic fetching of content when the user interacts with portions of the UI. As an example, upon passing the mouse pointer 104 over a graphical element 102, an onmouseover event may be generated which may in turn invoke a method to cause the graphical element 102 to change color. Similarly, upon moving the mouse pointer 104 out of the graphical element 102, an onmouseout event may be generated which may invoke a method to cause the graphical element 102 to return to its original color. This represents just one type of behavior that may be generated by the onmouseover and onmouseout events and is not intended to be limiting. For example, other possible behavior triggered by the onmouseover and onmouseout events may include making the graphical element 102 appear or disappear, become active or inactive, or the like.

In some cases, it may be desirable for several independent graphical elements 102 (such as the illustrated toolbar 102a and GUI widget 102b) to behave in a common manner. For example, continuing with the example presented above, if a mouse pointer 104 passes over a first graphical element 102a, thereby causing the first graphical element 102a to change color, it may also be desirable for a second graphical element 102b to change color. In other words, when a mouse pointer 104 or other selection element 104 causes some behavior to occur for a first graphical element 102a, it may also be desirable to automatically have the same or another desired behavior occur for another graphical element 102b. Similarly, when the mouse pointer 104 causes some behavior to occur for the second graphical element 102b, it may be desirable to automatically have the same or another desired behavior occur for the first graphical element 102a.

In addition to the behavior mentioned above, it may be desirable to have both the first and second graphical elements 102a, 102b behave as it they were a single graphical element 102. That is, as the mouse pointer 104 moves from the first graphical element 102a to the second graphical element 102b (as shown in FIG. 1), it may be desirable for the first and second graphical elements 102a, 102b to retain their behavior prior to the movement of the mouse pointer. For example, as the mouse pointer 104 moves from the first graphical element 102a to the second graphical element 102b (as shown in FIG. 1), it may be desirable to have the first graphical element 102a retain its color (rather than return to its original color). A method for causing the graphical elements 102 to behave in a common manner, or at least tie their behavior together, is disclosed in FIG. 2.

Figure 2:
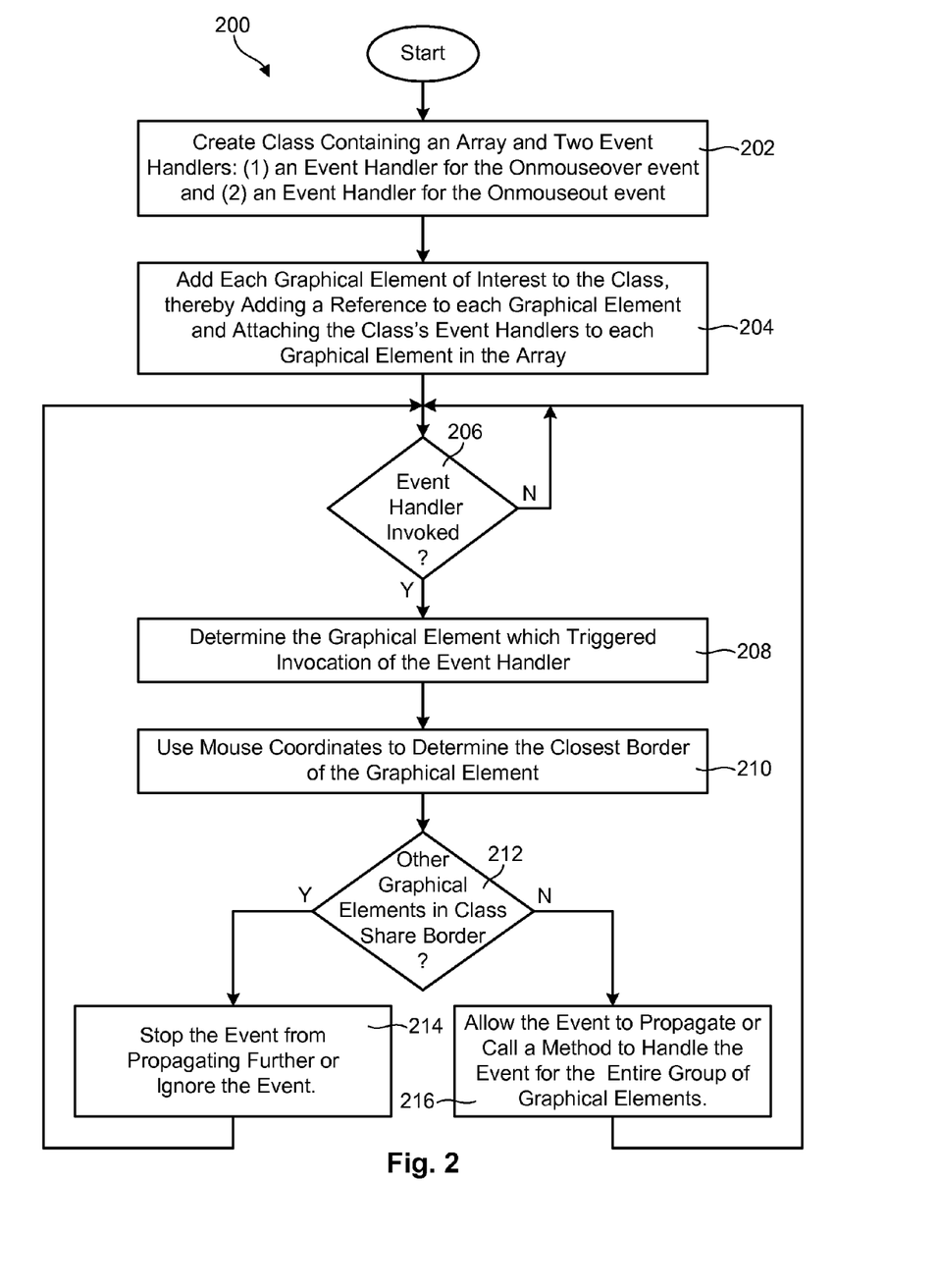
FIG. 2 is a flow chart showing one embodiment of a method for handling user-interface gestures in non-rectangular regions of a graphical user interface.

Referring to FIG. 2, one embodiment of a method 200 for handling user-interface gestures (e.g., mouse-pointer movements, finger movements where a touch screen is involved, etc.) in non-rectangular regions of a graphical user interface is disclosed. The method 200 includes initially creating 202 a class that contains an array and a pair of event handlers. The pair of event handlers include (1) an event handler to handle the onmouseover event and (2) an event handler to handle the onmouseout event. The method 200 then adds 204 each graphical element 102 (e.g., each DOM node 102) in the non-rectangular region 100 to the class. This may include adding a reference to each graphical element 102 to the class (by adding a reference to each graphical element 102 to the array) and attaching the class's event handlers to each graphical element 102 that has been added to the array.

The method 200 may then determine whether one of the class's event handlers has been invoked 206. For example, the event handler for the onmouseover event may be invoked if a mouse pointer moves into any graphical element 102 that is tied to the class. Similarly, the event handler for the onmouseout event may be invoked if a mouse pointer moves out of any graphical element 102 that is tied to the class. If one of the event handlers has been invoked 206, the method 200 determines 208 which graphical element 102 triggered the invocation of the event handler (i.e., which graphical element 102 the entering of which caused the onmouseover event to be invoked, or the exiting of which caused the onmouseout event to be invoked). Upon determining 208 the graphical element 102 that triggered the invocation, the method 200 uses 210 the location of the mouse pointer 104 to determine the closest border to the mouse pointer 104. A technique for determining the closest border will be discussed in association with FIG. 3.

Once the closest border is determined, the method 200 determines 212 whether any other graphical element 102 associated with the class shares a common border with the graphical element 102 determined in step 208. If so, the method 200 determines that the mouse pointer 104 is still within the non-rectangular region 100 and stops 214 the event (i.e., the onmouseover or onmouseout event) from propagating, or ignores 214 the event. This will stop any further action from being performed in response to the event. This will in turn cause the graphical elements 102 in the class to continue to exhibit the same behavior they exhibited before the event occurred.

On the other hand, if the method 200 determines 212 that the border is not shared with any other graphical element 102 in the class, the method 200 will determine that the mouse pointer exited the region 100. In such a case, the method 200 allows 216 the event to propagate or calls 216 a method to handle the event for the graphical elements 102 in the class. For example, if the mouse pointer 104 has exited the region 100, a method may be called to make the entire group of graphical elements 102 disappear, change color, or exhibit some other behavior. In this way, the onmouseover and onmouseout events are only propagated when the mouse pointer 104 exits the region 100 as a whole.

Figure 3:
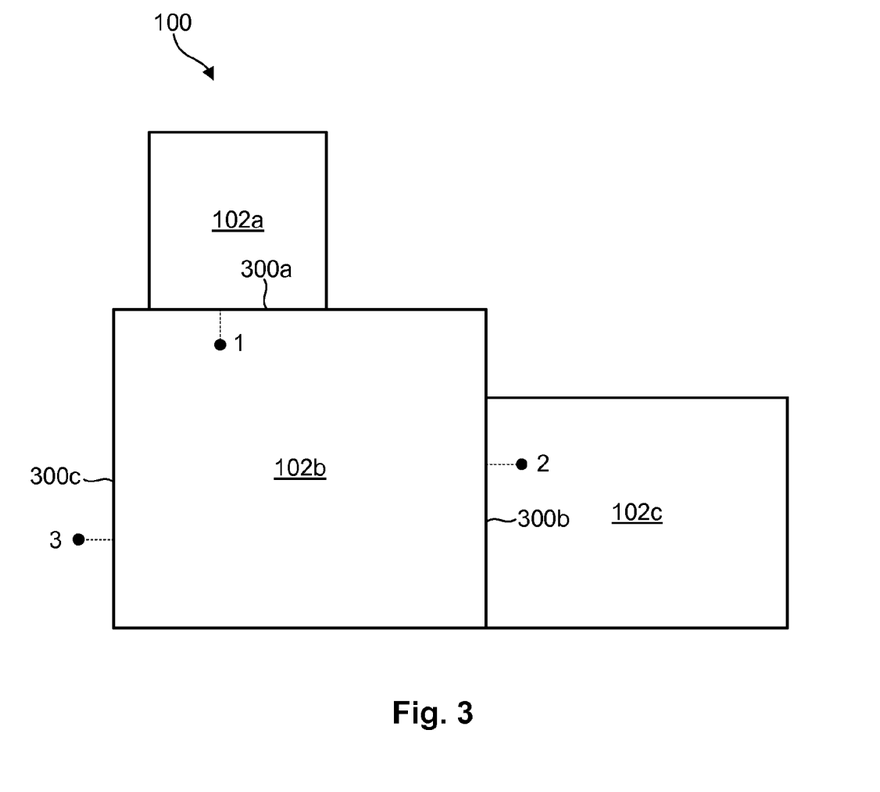
FIG. 3 is a high-level block diagram showing a technique for determining the closest border of a graphical element to a mouse pointer and whether the closest border is shared with another graphical element.

Referring to FIG. 3, a technique for determining the closest border of a graphical element 102 to a mouse pointer 104 or other selection element 104 is illustrated. As discussed in association with FIG. 2, the method 200 determines 208 which graphical element 102 triggered the invocation the event handler and uses 210 the location of the mouse pointer 104 to determine the closest border of the graphical element 102. This can be somewhat difficult as the mouse coordinates associated with the onmouseover and onmouseout events are rarely detected directly on the borders of the graphical element 102 from which they were generated.

For example, assume that an onmouseout event is generated and detected at point 1 as a mouse pointer 104 moves from the graphical element 102a to the graphical element 102b. This point is not detected directly on the border 300a of the graphical element 102a. However, the method 200 may determine the closest border by finding the border 300a that is closest to point 1. Because this border 300a is shared with the graphical element 102b, the method 200 stops the onmouseout event from propagating or ignores the event altogether.

In a second example, assume that an onmouseover event is generated and detected at point 2 as a mouse pointer 104 moves from the graphical element 102b into the graphical element 102c. This point is not detected directly on the border 300b of the graphical element 102c. In this case, the method 200 determines the closest border to be the border 300b. Because this border 300b is shared with the graphical element 102b, the method 200 stops the onmouseover event from propagating or ignores the event.

In a third example, assume that an onmouseout event is generated and detected at point 3 as a mouse pointer 104 moves from the graphical element 102b to a point outside the region 100 (i.e., outside the graphical elements 102a, 102b, 102c). In this case, the method 200 determines the closest border to be the border 300c. Because this border 300c is not shared with any other graphical element 102, the method 200 allows the event to propagate or calls a method to handle the event for the group of graphical elements 102a, 102b, 102c. This will allow the entire group of graphical elements 102a, 102b, 102c to exhibit some behavior, such as change color or disappear.

Figure 4:
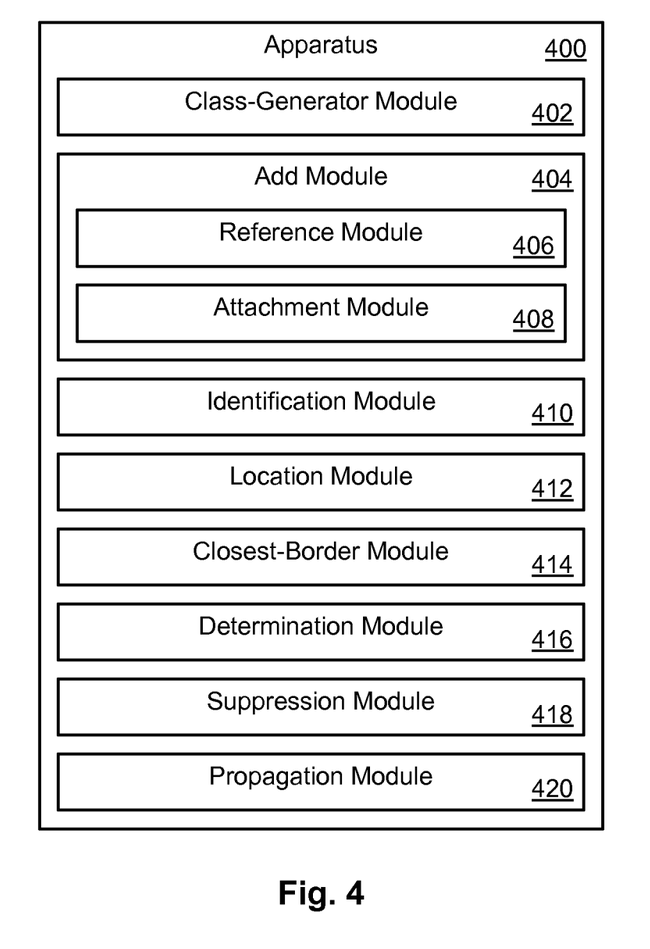
FIG. 4 is a high-level block diagram showing various modules that may be used to handle user-interface gestures in non-rectangular regions of a graphical user interface.

Referring to FIG. 4, the method 200 discussed in association with FIG. 2 may be implemented by an apparatus 400 comprising one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules, or conversely, the functionality of several modules may be combined into a single module or fewer modules. In selected embodiments, the apparatus 400 may include one or more of a class-generator module 402, an add module 404, an identification module 410, a location module 412, a closest-border module 414, a determination module 416, a suppression module 418, and a propagation module 420.

The class generator module 402 may generate a class that contains an array, an event handler to handle the onmouseover event, and an event handler to handle the onmouseout event. An add module 404 may add each graphical element 102 (e.g., each DOM node 102, etc.) in a region 100 to the class. When adding a graphical element 102 to the class, a reference module 406 may add a reference to the graphical element 102 to the array. An attachment module 408 may attach the class's event handlers to each graphical element 102 in the array.

When one of the class's event handlers has been invoked, an identification module 410 may identify the specific graphical element 102 in the region 100 that triggered the invocation of the event handler. A location module 412 may then determine the location of the mouse pointer 104 (using mouse coordinates or other means) when the event handler was invoked. Using this location, a closest-border module 414 may determine the closest border of the graphical element 102.

Once the closest-border module 414 has determined the closest border, a determination module 416 may determine whether any other graphical element 102 in the class shares the border. If another graphical element 102 has a border that shares the closest border, a suppression module 418 may stop the event from propagating or ignore the event, thereby stopping any further action from being performed. On the other hand, if no other graphical element 102 has a border that shares the closest border, a propagation module 420 may allow the event to propagate or call a method to handle the event for the entire group of graphical elements 102 in the class.

Figure 5:
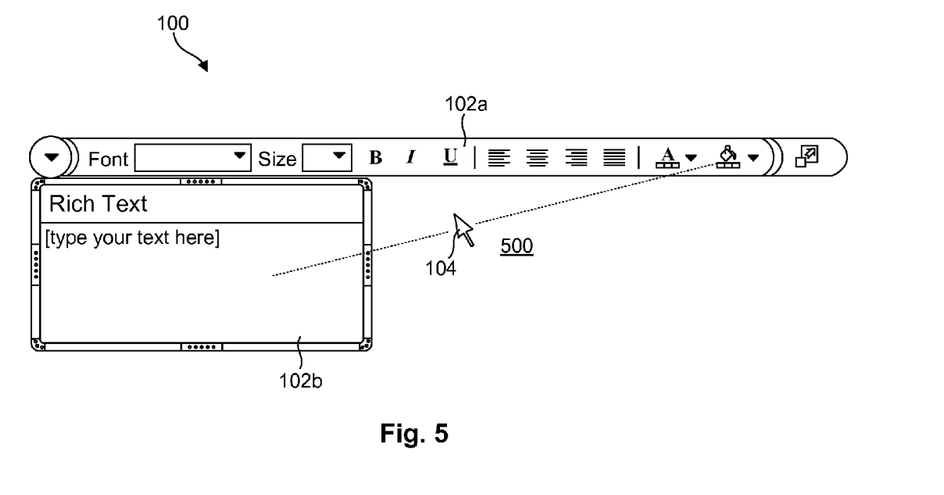
FIG. 5 is a diagram of a user interface showing two graphical elements, in this example a toolbar and a text box widget, and a mouse pointer moving over a gap between the two graphical elements.

Referring to FIG. 5, in certain cases, a mouse pointer 104 may pass over gaps between the graphical elements 102 which may cause the mouse pointer 104 to undesirably exit the region 100 as whole. For example, a user may move a mouse pointer 104 from the graphical element 102b to the right side of the graphical element 102a such that the mouse pointer 104 passes over a gap 500. This may undesirably cause the mouse pointer 104 to exit the region 100, thereby causing an onmouseout event to be triggered and propagated. This may in turn undesirably trigger certain behavior such as causing the graphical elements 102a, 102b to disappear or change color when the user really intends to remain within the region 100.

To address such a scenario, the method 200 may be configured to wait a specified amount of time before allowing an onmouseout event to propagate. For example, if an onmouseover event for a graphical element 102 in the region 100 is received before the specified amount of time elapses, the method 200 may suppress both the onmouseout and onmouseover events as if the mouse pointer 104 never left the region 100. In this way, the method 200 may be configured to compensate for gaps 500 that may exist between graphical elements 102a, 102b in the region 100.

Figure 6:
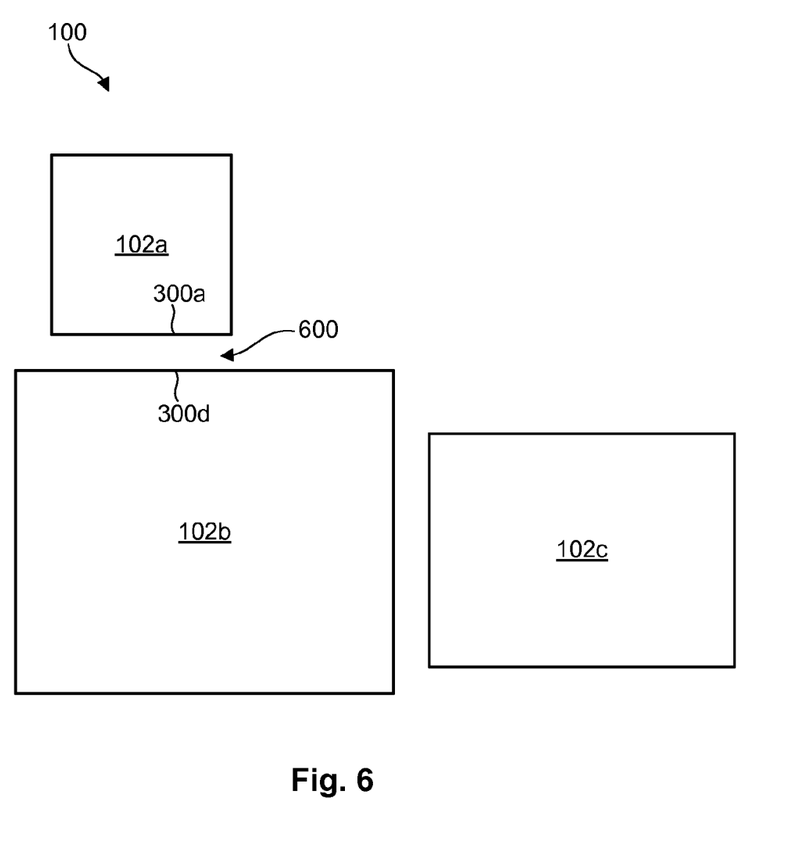
FIG. 6 is a high-level block diagram showing a technique for determining whether two graphical elements share a border when the borders are not exactly aligned.

Referring to FIG. 6, as previously mentioned, a method 200 in accordance with the invention determines whether graphical elements 102 share a common border. What constitutes a "common border" may vary in different embodiments. For example, a "common border" may mean that each graphical element 102 has a border that exactly overlaps all or in part. In other embodiments, a "common border" may mean that each graphical element 102 has a border that is parallel and within some specified distance from one another. For example, as shown in FIG. 6, the borders 300a, 300d may be determined to be "common borders" if they are within some specified distance from one another. Thus, in selected embodiments, a margin of error may be built into the definition of "common border." This may allow a mouse pointer 104 to pass over a gap 600 without exiting the region 100 as a whole.

Figure 7:
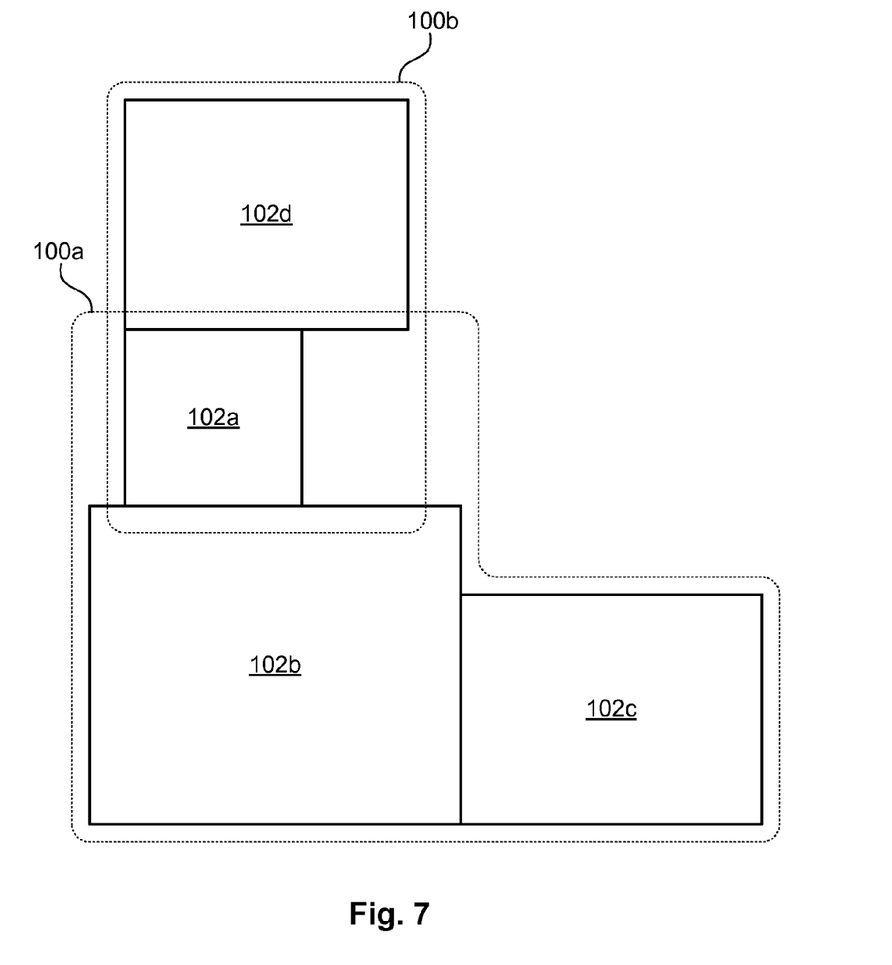
FIG. 7 is a high-level block diagram showing a graphical element that is shared by two non-rectangular regions.

Referring to FIG. 7, in selected embodiments, a graphical element 102a may be included in one than one region 100. For example, the graphical element 102a may be included in a first region 100a, comprising graphical elements 102a, 102b, 102c, and a second region 100b, comprising graphical elements 102a, 102d. In such an embodiment, the graphical element 102a may exhibit common behavior with the graphical element 102d and/or the graphical elements 102b, 102c. In such an embodiment, a first class may be generated that includes the graphical elements 102a, 102b, 102c, thereby linking their behavior, and a second class may be generated that includes the graphical elements 102a, 102d, thereby linking their behavior.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method comprising:
in response to detecting a first user-interface gesture that indicates entry into a first graphical element in a group of graphical elements triggering a first event, propagating, using a processor of a computer, the first event to the group of graphical elements to change a behavior of the group of graphical elements to a behavior specific to the first graphical element, wherein the group of graphical elements forms a non-rectangular region;
detecting a second user-interface gesture that indicates exit from the first graphical element triggering a second event;
in response to determining that a closest border of the first graphical element is shared with a another graphical element in the group of graphical elements,
delaying processing of the second event by a specific amount of time to allow movement over a gap between the first graphical element and the another graphical element, wherein the group of graphical elements retains the behavior while there is movement over the gap; and stopping propagation of the second event to the group of graphical elements, wherein the group of graphical elements retains the behavior; and in response to determining that the closest border of the first graphical element is not shared with another graphical element in the group of graphical elements, propagating the second event to the group of graphical elements to change the behavior of the group of graphical elements.

2. The method of claim 1, wherein the determination that the closest border of the first graphical element is not shared with another graphical element in the group of graphical elements indicates exit from the group of graphical elements.

3. The method of claim 1, wherein each graphical element in the group of graphical elements is a DOM node.

4. The method of claim 1, wherein the first event is an onmouseover event.

5. The method of claim 1, further comprising:
determining a shared border between the first graphical element in the group of graphical elements and the another graphical element in the group of graphical elements using mouse coordinates.

6. The method of claim 1, wherein the second event is an onmouseout event.

7. An apparatus comprising:
a processor; and
a storage device coupled to the processor, wherein the storage device stores program code, and wherein the processor executes the program code to perform operations, wherein the operations comprise:
in response to detecting a first user-interface gesture that indicates entry into a first graphical element in a group of graphical elements triggering a first event, propagating the first event to the group of graphical elements to change a behavior of the group of graphical elements to a behavior specific to the first graphical element, wherein the group of graphical elements forms a non-rectangular region;
detecting a second user-interface gesture that indicates exit from the first graphical element triggering a second event;
in response to determining that a closest border of the first graphical element is shared with a another graphical element in the group of graphical elements,
delaying processing of the second event by a specific amount of time to allow movement over a gap between the first graphical element and the another graphical element, wherein the group of graphical elements retains the behavior while there is movement over the gap; and
stopping propagation of the second event to the group of graphical elements, wherein the group of graphical elements retains the behavior; and
in response to determining that the closest border of the first graphical element is not shared with another graphical element in the group of graphical elements, propagating the second event to the group of graphical elements to change the behavior of the group of graphical elements.

8. The apparatus of claim 7, wherein the determination that the closest border of the first graphical element is not shared with another graphical element in the group of graphical elements indicates exit from the group of graphical elements.

9. The apparatus of claim 7, wherein each graphical element in the group of graphical elements is a DOM node.

10. The apparatus of claim 7, wherein the first event is an onmouseover event.

11. The apparatus of claim 7, wherein the operations further comprise:
determining a shared border between the first graphical element in the group of graphical elements and the another graphical element in the group of graphical elements using mouse coordinates.

12. The apparatus of claim 7, wherein the second event is an onmouseout event.

13. A computer program product, the computer program product comprising a non-transitory computer-readable storage medium having computer-usable program code embodied therein, the computer-usable program code, when executed by a processor of a computer causes the computer to perform:
in response to detecting a first user-interface gesture that indicates entry into a first graphical element in a group of graphical elements triggering a first event, propagating the first event to the group of graphical elements to change a behavior of the group of graphical elements to a behavior specific to the first graphical element, wherein the group of graphical elements forms a non-rectangular region;
detecting a second user-interface gesture that indicates exit from the first graphical element triggering a second event;
in response to determining that a closest border of the first graphical element is shared with a another graphical element in the group of graphical elements,
delaying processing of the second event by a specific amount of time to allow movement over a gap between the first graphical element and the another graphical element, wherein the group of graphical elements retains the behavior while there is movement over the gap; and
stopping propagation of the second event to the group of graphical elements, wherein the group of graphical elements retains the behavior; and
in response to determining that the closest border of the first graphical element is not shared with another graphical element in the group of graphical elements, propagating the second event to the group of graphical elements to change the behavior of the group of graphical elements.

14. The computer program product of claim 13, wherein the determination that the closest border of the first graphical element is not shared with another graphical element in the group of graphical elements indicates exit from the group of graphical elements.

15. The computer program product of claim 13, wherein each graphical element in the group of graphical elements is a DOM node.

16. The computer program product of claim 13, wherein the first event is an onmouseover event.

17. The computer program product of claim 13, wherein the computer-usable program code, when executed by the processor of the computer causes the computer to:
determining a shared border between the first graphical element in the group of graphical elements and the another graphical element in the group of graphical elements using mouse coordinates.

18. The computer program product of claim 13, wherein the second event is an onmouseout event.

\* \* \* \* \*